(12) United States Patent
Wada et al.

(10) Patent No.: US 7,458,406 B2
(45) Date of Patent: Dec. 2, 2008

(54) RUBBER COMPOSITION FOR SIDE WALL

(75) Inventors: Takao Wada, Kobe (JP); Mamoru Uchida, Kobe (JP); Tomoaki Hirayama, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/502,483

(22) Filed: Aug. 11, 2006

(65) Prior Publication Data

US 2007/0049670 A1   Mar. 1, 2007

(30) Foreign Application Priority Data

Aug. 26, 2005  (JP) ............................ 2005-246008

(51) Int. Cl.
*B60C 1/00*     (2006.01)

(52) U.S. Cl. .................. 152/525; 152/564; 524/526; 525/232; 525/236; 525/237; 525/333.1; 525/342

(58) Field of Classification Search ................ 524/261, 524/571, 575, 492, 526; 525/331.6, 342, 525/333.1, 523, 232, 236, 237; 152/525, 152/564

See application file for complete search history.

(56) References Cited

U.S. PATENT DOCUMENTS

| | | | | |
|---|---|---|---|---|
| 4,474,908 A | * | 10/1984 | Wagner | 523/213 |
| 5,396,940 A | * | 3/1995 | Segatta et al. | 152/209.1 |
| 6,230,773 B1 | * | 5/2001 | Sandstrom et al. | 152/517 |
| 6,384,118 B1 | * | 5/2002 | Hergenrother et al. | 524/265 |
| 6,458,882 B1 | * | 10/2002 | Pyle et al. | 524/492 |
| 6,465,581 B1 | * | 10/2002 | Wideman et al. | 525/332.7 |
| 2004/0192825 A1 | | 9/2004 | Zanzig et al. | |
| 2005/0209390 A1 | * | 9/2005 | Yagi et al. | 524/493 |

FOREIGN PATENT DOCUMENTS

| | | | |
|---|---|---|---|
| EP | 0 644 235 A1 | | 3/1995 |
| EP | 680 998 A1 | * | 4/1995 |
| EP | 0 803 535 A2 | | 10/1997 |
| EP | 0 824 131 A1 | | 2/1998 |
| EP | 824 131 A1 | * | 2/1998 |
| EP | 1 033 265 A2 | | 9/2000 |
| EP | 1 231 080 A1 | | 8/2002 |
| JP | 07-118454 A | | 5/1995 |
| JP | 07-149955 A | | 6/1995 |
| JP | 07-292158 A | | 11/1995 |
| JP | 10-060175 A | | 3/1998 |
| JP | 11-286577 A | | 10/1999 |
| JP | 2002-265678 A | | 9/2002 |
| JP | 2003-063206 A | | 3/2003 |
| JP | 2005-126471 A | | 5/2005 |
| JP | 2006-70093 | * | 3/2006 |
| KR | 1998-18675 A | | 6/1998 |

OTHER PUBLICATIONS

JP 2006-70093 (translation in English).*

* cited by examiner

*Primary Examiner*—Bernard Lipman
(74) *Attorney, Agent, or Firm*—Birch, Stewart, Kolasch & Birch, LLP

(57) ABSTRACT

There is provided a rubber composition for a side wall, wherein an amount ratio of resources other than petroleum are increased so as to be ecological and take measures for the decrease in supply of petroleum in the future, which further has excellent flex crack resistance and strength.

A rubber composition for a side wall comprising 20 to 60 parts by weight of silica based on 100 parts by weight of a rubber component comprising 40 to 80% by weight of a natural rubber and 60 to 20% by weight of at least one rubber selected from the group consisting of a butadiene rubber, a styrene-butadiene rubber and an epoxidized natural rubber, and 4 to 16 parts by weight of a silane compound represented by the following formula:

$$X_n\text{—Si—}Y_{4-n}$$

(wherein X represents an ethoxy group or a methoxy group, and Y represents a phenyl group or an alkyl group) based on 100 parts by weight of silica.

4 Claims, No Drawings

RUBBER COMPOSITION FOR SIDE WALL

BACKGROUND OF THE INVENTION

The present invention relates to a rubber composition for a side wall, assuming when petroleum depletes, and further relates to a rubber composition for a side wall having excellent strength and flex crack resistance.

As a rubber composition for the side wall of a tire, a butadiene rubber has been conventionally blended for improving the flex crack resistance in addition to a natural rubber exhibiting excellent tear strength, and further, carbon black has been used for improving weather resistance and reinforcing property.

However, environmental problems have been recently emphasized, and the regulation of $CO_2$ discharge control has been enforced. Further, since petroleum raw material is finite, and its supply quantity has been reduced year by year, the enhancement of petroleum price is estimated in the future, and there is limit for using raw materials comprising petroleum resources such as a butadiene rubber and carbon black. Consequently, assuming a case where petroleum depletes in the future, it is necessary to use resources other than petroleum such as a natural rubber, and white fillers such as silica and calcium carbonate. However, in such case, there is required to have the same or more performances such as the flex crack resistance and reinforcing property than those which are obtained by the use of the conventionally used petroleum resources.

For example, JP-A-2003-63206 discloses technology which shows raw materials for a tire assuming when petroleum depletes, but the reference does not disclose a rubber composition for a tire side wall which exhibits adequate flex crack resistance and strength.

SUMMARY OF THE INVENTION

An object of the present invention is to provide a rubber composition for a side wall, wherein an amount ratio of resources other than petroleum are increased so as to be ecological and take measures for the decrease in supply of petroleum in the future, which further has excellent flex crack resistance and strength.

The present invention relates to a rubber composition for a side wall comprising 20 to 60 parts by weight of silica based on 100 parts by weight of a rubber component comprising 40 to 80% by weight of a natural rubber and 60 to 20% by weight of at least one rubber selected from the group consisting of a butadiene rubber, a styrene-butadiene rubber and an epoxidized natural rubber, and 4 to 16 parts by weight of a silane compound represented by the following formula:

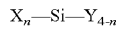
$$X_n\text{—Si—}Y_{4-n}$$

(wherein X represents an ethoxy group or a methoxy group, and Y represents a phenyl group or an alkyl group) based on 100 parts by weight of silica.

The rubber component preferably comprises 40 to 80% by weight of the natural rubber and 60 to 20% by weight of a butadiene rubber.

Further, the rubber component comprises 40 to 80% by weight of the natural rubber and 60 to 20% by weight of the epoxidized natural rubber.

BEST MODE FOR CARRYING OUT THE INVENTION

The rubber composition for a side wall of the present invention comprises a rubber component, silica and a silane compound.

The rubber component comprises a natural rubber. As the natural rubber, generally used natural rubbers such as TSR20 and RSS#3 may be used.

Further, the natural rubber comprises at least one rubbers (hereinafter, rubber A) selected from the group consisting of a butadiene rubber, a styrene-butadiene rubber, and an epoxidized natural rubber.

As the rubber A, an epoxidized natural rubber is particularly preferable because of the reason that it is a resource other than petroleum and ecological.

As the epoxidized natural rubber, a commercially available epoxidized natural rubber may be used, or a natural rubber may be epoxidized to be used. A method of epoxidizing a natural rubber is not specifically limited, and can be carried out by using methods such as a chlorhydrin method, a direct oxidation method, a hydrogen peroxide method, an alkylhydroperoxode method, and a peracid method. As the peracid method, an example is a method of reacting a natural rubber with organic peracids such as peracetic acid and performic acid.

An epoxidation ratio of the epoxidized natural rubber is preferably at least 10% by mol. When the epoxidation ratio is less than 10% by mol, since the epoxidized natural rubber becomes compatible with a natural rubber, an effect tends to be lowered. Further, the epoxidation ratio of the epoxidized natural rubber is preferably at most 60% by mol, and more preferably at most 50% by mol. When the epoxidation ratio exceeds 60% by mol, rubber strength of the obtained rubber composition tends to be insufficient.

An amount ratio of the natural rubber in the rubber component is at least 40% by weight, and the amount ratio of the rubber A is at most 60% by weight. When the amount ratio of the natural rubber is less than 40% by weight and the amount ratio of the rubber A exceeds 60% by weight, the rubber strength of the obtained rubber composition is insufficient. Further, the amount ratio of the natural rubber is at most 80% by weight, and preferably at most 60% by weight, and the amount ratio of the rubber A is 20% by weight at least, and preferably at least 40% by weight. When the amount ratio of the natural rubber exceeds 80% by weight and the amount ratio of the rubber A is less than 20% by weight, flex crack resistance is deteriorated.

As the rubber component, rubbers such as a butyl rubber, a halogenated butyl rubber and the halogenated product of a copolymer of an isobutylene and p-methylstyrene can be used in addition to the natural rubber and rubber A, however, the rubber component preferably comprises only the natural rubber and the epoxidized natural rubber since it can be obtained from resources other than petroleum.

Silica in the rubber composition for a side wall is not particularly limited and those generally used in the tire industry can be used.

An amount of silica is at least 20 parts by weight based on 100 parts by weight of the rubber component, and preferably at least 25 parts by weight. When the amount is less than 20 parts by weight, tear strength is low, and there is possibility to generate breakage when being brought in contact with protruded articles during running. Further, the amount of silica is at most 60 parts by weight, and preferably at most 50 parts by weight. When the amount of silica exceeds 60 parts by weight, flex crack resistance becomes inferior.

The silane compound of the present invention is represented by the following formula:

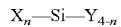
$$X_n\text{—Si—}Y_{4-n}$$

In the formula, n is an integer of 1 to 3. The silane compound does not have an ethoxy group or a methoxy group when n is 0, and there is tendency that the silane compound can not react with silica. Further, when n is 4, the silane compound tends to be hardly compatible with a rubber.

X is selected from an ethoxy group or a methoxy group. An alkoxy group also includes a group having a large carbon number, such as a propoxy group, and a butoxy group, but since they easily react with silica, an ethoxy group or a methoxy group is preferable.

Y represents a phenyl group or an alkyl group.

Examples of the silane compound satisfying the above-mentioned formula are phenyltrimethoxysilane (such as KBM103 available from Shin-Etsu Chemical Co., Ltd.), phenyltriethoxysilane (such as KBE103 available from Shin-Etsu Chemical Co., Ltd.), hexyltrimethoxysilane (such as KBE3063 available from Shin-Etsu Chemical Co., Ltd.), decyltrimethoxysilane (such as KBM3063 available from Shin-Etsu Chemical Co., Ltd.), decyltriethoxysilane (such as KBE3063 available from Shin-Etsu Chemical Co., Ltd.), methyltrimethoxysilane (such as KBM13 available from Shin-Etsu Chemical Co., Ltd.), dimethyldimethoxysilane (such as KBM22 available from Shin-Etsu Chemical Co., Ltd.), diphenyldimethoxysilane (such as KBM202SS available from Shin-Etsu Chemical Co., Ltd.), methyltriethoxysilane (such as KBE13 available from Shin-Etsu Chemical Co., Ltd.), dimethyldiethoxysilane (such as KBE22 available from Shin-Etsu Chemical Co., Ltd.), diphenyldiethoxysilane (such as KBE202 available from Shin-Etsu Chemical Co., Ltd.), decyltrimethoxysilane (such as KBM3103 available from Shin-Etsu Chemical Co., Ltd.), and trifluoropropyltrimethoxysilane (such as KBM7103 available from Shin-Etsu Chemical Co., Ltd.).

The amount of the silane compound is at least 4 parts by weight based on 100 parts by weight of silica and preferably at least 8 parts by weight. When the amount of the silane compound is less than 4 parts by weight, adequate flex crack resistance and tear strength is not obtained. Further, the amount of the silane compound is at most 16 parts by weight based on 100 parts by weight of silica and preferably at most 12 parts by weight. When the amount of the silane compound exceeds 16 parts by weight, the tear strength is lowered.

A silane coupling agent can be used in combination with silica and the silane compound in the present invention. The silane coupling agent is not particularly limited, and those such as a sulfide silane coupling agent such as Si69 which are generally used in the tire industry can be used.

The amount of the silane coupling agent is preferably 4 to 20 parts by weight based on 100 parts by weight of silica. When the amount is less than 4 parts by weight, the flex crack resistance tends to be inferior, and even if it exceeds 20 parts by weight, the flex crack resistance tends to be also inferior.

Since it is the purpose of the rubber composition for a side wall of the present invention to utilize resources other than petroleum and it is preferable that an aroma oil is not used.

Since it is the purpose of the rubber composition for a side wall of the present invention to utilize resources other than petroleum and it is preferable that a petroleum resin is not used.

A tire containing a side wall comprising the rubber composition of the present invention can be prepared by a usual process using the rubber composition for a side wall of the present invention. Namely, unvulcanized tires are formed by extruding and processing the rubber composition for a side wall of the present invention using chemicals such as a softener, an antioxidant, stearic acid, zinc oxide, if necessary, in the shape of the side wall of tires at the unvulcanized stage and molding it on a tire molding machine by a usual process. Tires are obtained by heating and pressurizing the unvulcanized tires in a vulcanizer.

As the obtained tires, pneumatic tires are preferable, and tires for an automobile with a low petroleum resource ratio are more preferable.

The rubber composition for a side wall of the present invention can enlarge a ratio of resources other than petroleum to be 52 to 95% by weight in the rubber composition, and if the ratio is within the range, the rubber composition can exhibit tear strength and flex crack resistance, which are equivalent to those of a conventional rubber composition for a side wall having a low ratio of petroleum resources. Further, the ratio of resources other than petroleum refers to a ratio of the whole compounding amount of chemicals obtained from the resources other than petroleum based on the whole amount of the rubber composition.

EXAMPLES

The present invention is explained in detail based on Examples in the following, but the present invention is not limited only thereto.

Various chemicals used in Examples are specifically described in the following.

Natural rubber: TSR20

Synthetic rubber (BR): BR150B available from Ube Industries Ltd.

Epoxidized natural rubber 1: ENR25 (epoxidation ratio of 25% by mol) available from Kumpulan Guthrie Berhad Co.

Epoxidized natural rubber 2: ENR50 (epoxidation ratio of 50% by mol) available from Kumpulan Guthrie Berhad Co.

Carbon black: FEF available from Mitsubishi Chemicals Corporation

Silica: VN3 available from Degussa Japan Corporation

Coupling agent: Si69 available from Degussa Japan Corporation

Aroma oil: PROCESS X-140 available from Japan Energy Corporation

Petroleum base resin: SP1068 Resin available from Nippon Shokubai Co., Ltd.

WAX: OZOACE 0355 available from NIPPON SEIRO Co., Ltd.

Antioxidant: ANTIGENE 6C available from Sumitomo Chemical Co., Ltd.

Stearic acid: STEARIC ACID "TSUBAKI" available from NOF Corporation

Zinc oxide: ZINC OXIDE available from Mitsui Mining & Smelting Co., Ltd.

Sulfur: SULFUR POWDER available from Tsurumi Chemical Industry Co., Ltd.

Vulcanization accelerator: NOCCELER NS (N-tert-butyl-2-benzothiazolylsulfanamide) available from OUCHI SHINKO CHEMICAL INDUSTRIAL CO., LTD.

Silane Compound 1: KBE-103 available from Shin-Etsu Chemical Co., Ltd. (phenyltriethoxysilane)

Silane Compound 2: KBM-103 available from Shin-Etsu Chemical Co., Ltd. (phenyltrimethoxysilane)

Silane Compound 3: KBM-3063 available from Shin-Etsu Chemical Co., Ltd. (hexyltrimethoxysilane)

Further, in the above-mentioned chemicals, chemicals obtained from resources other than petroleum are the natural rubber, epoxidized natural rubber, silica, stearic acid, zinc oxide and sulfur.

Examples 1 to 9 and Comparative Examples 1 to 10

Preparation of Rubber Composition

The above-mentioned chemicals excluding sulfur and a vulcanization accelerator were added according to the compounding amounts shown in Table 1 to a 1.7 litter-Banbury mixer manufactured by Kobe Steel., Ltd. and the mixture was kneaded at 80 rpm until reaching at 140° C.

The sulfur and vulcanization accelerator were added to the obtained kneaded articles, according to the compounding amounts shown in Table 1, and the mixture was kneaded with an 8 inches roll for 4 minutes. The rubber test pieces of Examples 1 to 9 and Comparative Examples 1 to 10 were prepared by vulcanizing the obtained unvulcanized rubber compositions at 160° C. for 20 minutes.

The following tests were carried out using the obtained rubber test pieces.

<Test>

(Hardness)
The hardness of the test pieces were measured at 25° C. using spring type A in accordance with the test method of "Hardness test method of vulcanized rubber and thermoplastic rubber" of JIS-K6253.

(Tear Test)
Tear strength (N/mm) was measured at 25° C. using angle-shaped rubber test pieces without notching in accordance with the test method of "Tear strength measurement method of vulcanized rubber and thermoplastic rubber" of JIS-K6252.

(De Mattia Test)
The number of times until 1 mm fracture is generated in rubber test pieces under the condition at a room temperature of 25° C. were measured in accordance with the test method of "De mattia bending crack growth test method of vulcanized rubber and thermoplastic rubber" of JIS-6260. Herein, log (10,000 times/mm) represents the number of the measurement times until fracture is generated with logarithm. It is indicated that the larger the value is, the more excellent the flex crack resistance is. Further, 70% and 110% represent an elongation ratio to the surface length of the original rubber test pieces.

The result is shown in Table 1.

TABLE 1

| Kinds of materials | Example | | | | | | | | |
|---|---|---|---|---|---|---|---|---|---|
| | 1 | 2 | 3 | 4 | 5 | 6 | 7 | 8 | 9 |
| Amount (part by weight) | | | | | | | | | |
| Natural rubber | 60 | 60 | 60 | 60 | 60 | 40 | 60 | 80 | 60 |
| Synthetic rubber (BR) | — | — | — | — | — | 60 | 40 | 20 | — |
| Epoxidized natural rubber 1 | 40 | 40 | 40 | 40 | 40 | — | — | — | — |
| Epoxidized natural rubber 2 | — | — | — | — | — | — | — | — | 40 |
| Carbon black | — | — | — | — | — | — | — | — | — |
| Silica | 28 | 28 | 28 | 28 | 28 | 28 | 28 | 28 | 28 |
| Coupling agent | 2.24 | 2.24 | 2.24 | 2.24 | 2.24 | 2.24 | 2.24 | 2.24 | 2.24 |
| Silane compound 1 | 1.12 | 2.24 | 4.48 | — | — | 2.24 | 2.24 | 2.24 | 2.24 |
| Silane compound 2 | — | — | — | 2.24 | — | — | — | — | — |
| Silane compound 3 | — | — | — | — | 2.24 | — | — | — | — |
| Aroma oil | — | — | — | — | — | — | — | — | — |
| Petroleum resin | — | — | — | — | — | — | — | — | — |
| WAX | 1.2 | 1.2 | 1.2 | 1.2 | 1.2 | 1.2 | 1.2 | 1.2 | 1.2 |
| Antioxidant | 2.4 | 2.4 | 2.4 | 2.4 | 2.4 | 2.4 | 2.4 | 2.4 | 2.4 |
| Stearic acid | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 |
| Vulcanization accelerator | 0.7 | 0.7 | 0.7 | 0.7 | 0.7 | 0.7 | 0.7 | 0.7 | 0.7 |
| Evaluation results | | | | | | | | | |
| Ratio of resources except for petroleum (%) | 94.6 | 93.9 | 92.5 | 93.9 | 93.9 | 52.2 | 66.1 | 80.0 | 93.9 |
| Hardness | 43 | 43 | 43 | 43 | 43 | 47 | 46 | 45 | 45 |
| Tear strength (N/mm) | 44 | 50 | 52 | 51 | 48 | 43 | 43 | 42 | 53 |
| De mattia | | | | | | | | | |
| log (10,000 times/mm 70%) | 7.3 | 7.2 | 7.3 | 7 | 7.1 | 7.6 | 7.5 | 7.4 | 7 |
| log (10,000 times/mm 110%) | 6.2 | 6.4 | 6.3 | 6.5 | 6.2 | 6.2 | 6.1 | 5.8 | 6.6 |

| Kinds of materials | Comparative Example | | | | | | | | | |
|---|---|---|---|---|---|---|---|---|---|---|
| | 1 | 2 | 3 | 4 | 5 | 6 | 7 | 8 | 9 | 10 |
| Amount (part by weight) | | | | | | | | | | |
| Natural rubber | 40 | 40 | 100 | 100 | 100 | 80 | 60 | 60 | 60 | 60 |
| Synthetic rubber (BR) | 60 | 60 | — | — | — | 20 | — | — | — | — |
| Epoxidized natural rubber 1 | — | — | — | — | — | — | 40 | 40 | 40 | 40 |
| Epoxidized natural rubber 2 | — | — | — | — | — | — | — | — | — | — |
| Carbon black | 50 | — | — | — | — | — | — | — | — | — |

TABLE 1-continued

| | | | | | | | | | | |
|---|---|---|---|---|---|---|---|---|---|---|
| Silica | — | 48 | 48 | 38 | 28 | 28 | 38 | 28 | 28 | 28 |
| Coupling agent | — | 3.84 | 3.84 | 3.04 | 2.24 | 2.24 | 3.04 | 2.24 | 2.24 | 2.24 |
| Silane compound 1 | — | — | — | — | — | — | — | — | 0.56 | 6.72 |
| Silane compound 2 | — | — | — | — | — | — | — | — | — | — |
| Silane compound 3 | — | — | — | — | — | — | — | — | — | — |
| Aroma oil | 5 | — | — | — | — | — | — | — | — | — |
| Petroleum resin | 3 | — | — | — | — | — | — | — | — | — |
| WAX | 1.2 | 1.2 | 1.2 | 1.2 | 1.2 | 1.2 | 1.2 | 1.2 | 1.2 | 1.2 |
| Antioxidant | 2.4 | 2.4 | 2.4 | 2.4 | 2.4 | 2.4 | 2.4 | 2.4 | 2.4 | 2.4 |
| Stearic acid | 2.5 | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 | 3 |
| Sulfur | 1.5 | 1.5 | 1.5 | 1.5 | 1.5 | 1.5 | 1.5 | 1.5 | 1.5 | 1.5 |
| Vulcanization accelerator | 0.7 | 0.7 | 0.7 | 0.7 | 0.7 | 0.7 | 0.7 | 0.7 | 0.7 | 0.7 |
| Evaluation results | | | | | | | | | | |
| Ratio of resources except for petroleum (%) | 27.8 | 58.2 | 95.0 | 95.2 | 95.4 | 81.2 | 95.2 | 95.4 | 95.0 | 91.1 |
| Hardness | 52 | 57 | 55 | 50 | 45 | 47 | 47 | 42 | 42 | 41 |
| Tear strength (N/mm) | 52 | 53 | 50 | 43 | 35 | 30 | 50 | 38 | 40 | 46 |
| De mattia | | | | | | | | | | |
| log (10,000 times/mm 70%) | 7 | 7.3 | 6.5 | 6.7 | 7 | 7.3 | 6.9 | 7.3 | 7.3 | 7.2 |
| log (10,000 times/mm 110%) | 6.5 | 6.6 | 4.9 | 5.2 | 5.4 | 5 | 6.3 | 6 | 6.1 | 6.2 |

In Examples 1 to 9, when an appropriate amount of the silane compound was used, the tear strength and the flex crack resistance at an elongation ratio of 110% are improved.

In Comparative Examples 1 to 8, the silane compound was not compounded, and the tear strength and the flex crack resistance are not improved in addition to enhancing the proportion of resources other than petroleum in the rubber compositions.

Further, in Comparative Example 9, since the amount of the silane compound is small, a compounding effect is little, and in Comparative Example 10, since the amount of the silane compound is large, hardness is insufficient.

According to the present invention, a rubber composition for a side wall having excellent flex crack resistance and strength, wherein an amount ratio of resources other than petroleum are increased since the large amount of the resources other than petroleum is compounded so as to be ecological and take measures for the decrease in supply of petroleum in the future, can be provided by compounding the specific amounts of a specific silane compound and silica.

What is claimed is:

1. A tire containing a side wall, wherein the side wall is formed from a rubber composition which comprises:
   20 to 60 parts by weight of silica based on 100 parts by weight of a rubber component comprising 40 to 80% by weight of a natural rubber and 60 to 20% by weight of an epoxidized natural rubber; and
   4 to 16 parts by weight of a silane compound represented by the following formula:

$$X_n\text{—Si—}Y_{4-n}$$

wherein X represents an ethoxy group or a methoxy group, Y represents a phenyl group or an alkyl group, and n is an integer of 1 to 3, based on 100 parts by weight of silica.

2. The tire of claim 1, wherein the silica is present in an amount of 20 parts by weight based on 100 parts by weight of the rubber component.

3. The tire of claim 1, wherein the silica is present in an amount of 25 to 50 parts by weight based on 100 parts by weight of the rubber component.

4. The tire of claim 1, wherein the silane compound is present in the amount of 8 to 12 parts by weight.

* * * * *